United States Patent
Velez-McCaskey

(10) Patent No.: US 10,289,308 B2
(45) Date of Patent: May 14, 2019

(54) ARCHITECTURE AND METHOD FOR AN INTERCONNECTED DATA STORAGE SYSTEM USING A UNIFIED DATA BUS

(71) Applicant: Ricardo Eugenio Velez-McCaskey, Nashua, NH (US)

(72) Inventor: Ricardo Eugenio Velez-McCaskey, Nashua, NH (US)

( * ) Notice: Subject to any disclaimer, the term of this patent is extended or adjusted under 35 U.S.C. 154(b) by 399 days.

(21) Appl. No.: 15/130,626

(22) Filed: Apr. 15, 2016

(65) Prior Publication Data

US 2016/0306551 A1   Oct. 20, 2016

Related U.S. Application Data

(60) Provisional application No. 62/147,906, filed on Apr. 15, 2015.

(51) Int. Cl.
  *G06F 13/00* (2006.01)
  *G06F 3/06* (2006.01)
  *G06F 13/42* (2006.01)
  *G06F 13/16* (2006.01)
  *G06F 13/37* (2006.01)

(52) U.S. Cl.
  CPC .............. *G06F 3/061* (2013.01); *G06F 3/065* (2013.01); *G06F 3/0619* (2013.01); *G06F 3/0659* (2013.01); *G06F 3/0689* (2013.01); *G06F 13/1657* (2013.01); *G06F 13/37* (2013.01); *G06F 13/4282* (2013.01)

(58) Field of Classification Search
  CPC .. G06F 13/1657; G06F 13/37; G06F 13/4282; G06F 3/061; G06F 3/0619; G06F 3/065; G06F 3/0659; G06F 3/0689
  See application file for complete search history.

(56) References Cited

U.S. PATENT DOCUMENTS 9,003,144 B1 * 4/2015 Hayes ..................... G06F 3/065
                                                             711/103

* cited by examiner

*Primary Examiner* — Idriss N Alrobaye
*Assistant Examiner* — Richard B Franklin

(57) ABSTRACT

A system and method for providing an interconnected data storage system that is able to avoid multiple data transfers, and thus increase the overall performance of the interconnected data storage system. A unified data bus interconnects a computing device with a plurality of storage devices via a plurality of storage systems; each of the plurality of storage systems having a main memory, processor, at least one storage controller, and a connecting port. The unified data bus is a local, high bandwidth bus that allows resources to be shared between the plurality of storage systems and with the computing device. Additionally, the unified data bus allows data to be transferred from the computing device to each of the plurality of storage devices in a single multi-target transfer. Furthermore, the architecture allows for a simpler management software that further increases performance of the interconnected data storage system.

3 Claims, 9 Drawing Sheets

ARCHITECTURE AND METHOD FOR AN INTERCONNECTED DATA STORAGE SYSTEM USING A UNIFIED DATA BUS

The current application claims a priority to the U.S. Provisional Patent application Ser. No. 62/147,906 filed on Apr. 15, 2015.

FIELD OF THE INVENTION

The present invention relates generally to the field of data storage. More specifically, the present invention is an architecture and method for interconnected data storage systems.

BACKGROUND OF THE INVENTION

An independent storage system is a computer in which data is spread or "stripped" across multiple disk drives. In many implementations data is stored along with parity or redundant information such that any data lost as a result of disk failures can be automatically reconstructed. Independent storage systems, or storage nodes, are self-contained, and if required to connect multiple storage systems for adding capacity and/or throughput, this connection is accomplished through the network to form what is called a storage cluster. There are many implementations and methods of storage clusters which all consist of complex management software to distribute storage across all storage nodes. In theory, by adding storage nodes, the throughput should increase, but because of network overhead and adding sophisticated block or file management, the performance does not increase linearly and saturates after adding a fairly small number of storage nodes because of creation of new bottlenecks that traditional clusters impose. When storage nodes are created, the need of a meta-data controller to re-direct the client request to the storage node that requested data is contained.

To illustrate several of the motivations behind the present invention, a prevalent prior art architecture used within existing storage systems will be described. In a first prior art architecture, the storage cluster includes multiple array controller cards ("array controllers") that couple an array of disk drives to a local main memory and micro-processor through a local Peripheral Component Interconnect Express (PCIe) bus. The array controllers plug into the PCIe expansion slot of the storage computer and communicate with the micro-processor and the main memory via the local PCIe bus. A network interconnect card (NIC) is used to connect client computers to the storage system. The NIC can have one or more ports that are able to connect to a standard network and behaves as a storage target for the client computers. Data is transferred from the network through the NIC and to the main memory. The data, now residing in the main memory, is then transferred to one or more of the array controllers through the local PCIe bus.

In a second prior art architecture, a front-end network switch provides a means of communication between the client computers communicate and the storage cluster. The storage cluster requires the addition of meta-data controllers that reside on storage nodes within the storage cluster in order to re-direct appropriate data requests from the client computers to the node that contains the requested data. This management adds a considerable overhead, because not only does it create network chatting between nodes to coordinate, but there is also the possibility of creating usage bottlenecks if multiple clients request data that resides in the same storage node.

A third prior art architecture, is a recent development that has adopted the use of PCIe to PCIe bridges to access common storage from several storage systems. However, this solution does not constitute a cluster, as the storage systems do not work as a global storage pool but instead work as independent storage systems that share common storage resources with limited expansion capabilities and performance.

Therefore it is the object of the present invention to provide a storage cluster comprising a unified data bus and a plurality of storage systems; the plurality of storage systems being interconnected by the unified data bus, allowing client computers to transfer data through a much faster pipe. By extending the bus architecture across the plurality of storage systems, the processor of each of the storage systems becomes an element of a global system that can use the resources of the other storage systems without having to do multiple data transfers. By connecting the storage systems to the unified data bus, management software is drastically simplified avoiding many issues, such as ownership and other special circumstances such as moving data and over-spillage from one storage system to the next. Furthermore, to avoid multiple data transfers, a multi-target remote direct memory access (RDMA) transfer can accomplish, n, number of data copies without any extra overhead by sending the data to all storage systems simultaneously in one transfer.

DETAIL DESCRIPTIONS OF THE INVENTION

All illustrations of the drawings are for the purpose of describing selected versions of the present invention and are not intended to limit the scope of the present invention.

The present invention is a system and method for providing an interconnected data storage system that is able to avoid multiple data transfers, and thus increase the overall performance of the interconnected data storage system. In reference to FIG. 1, the interconnected data storage system comprises a computing device 2, a plurality of storage devices 3, and a storage cluster 1, wherein the computing device 2 is connected to the plurality of storage devices 3 via the storage cluster 1. The computing device 2 can be a personal computer, a server, or any other type of computer that is capable of sending transfer commands in order to perform data transfers with the plurality of storage devices 3.

Figure 1:
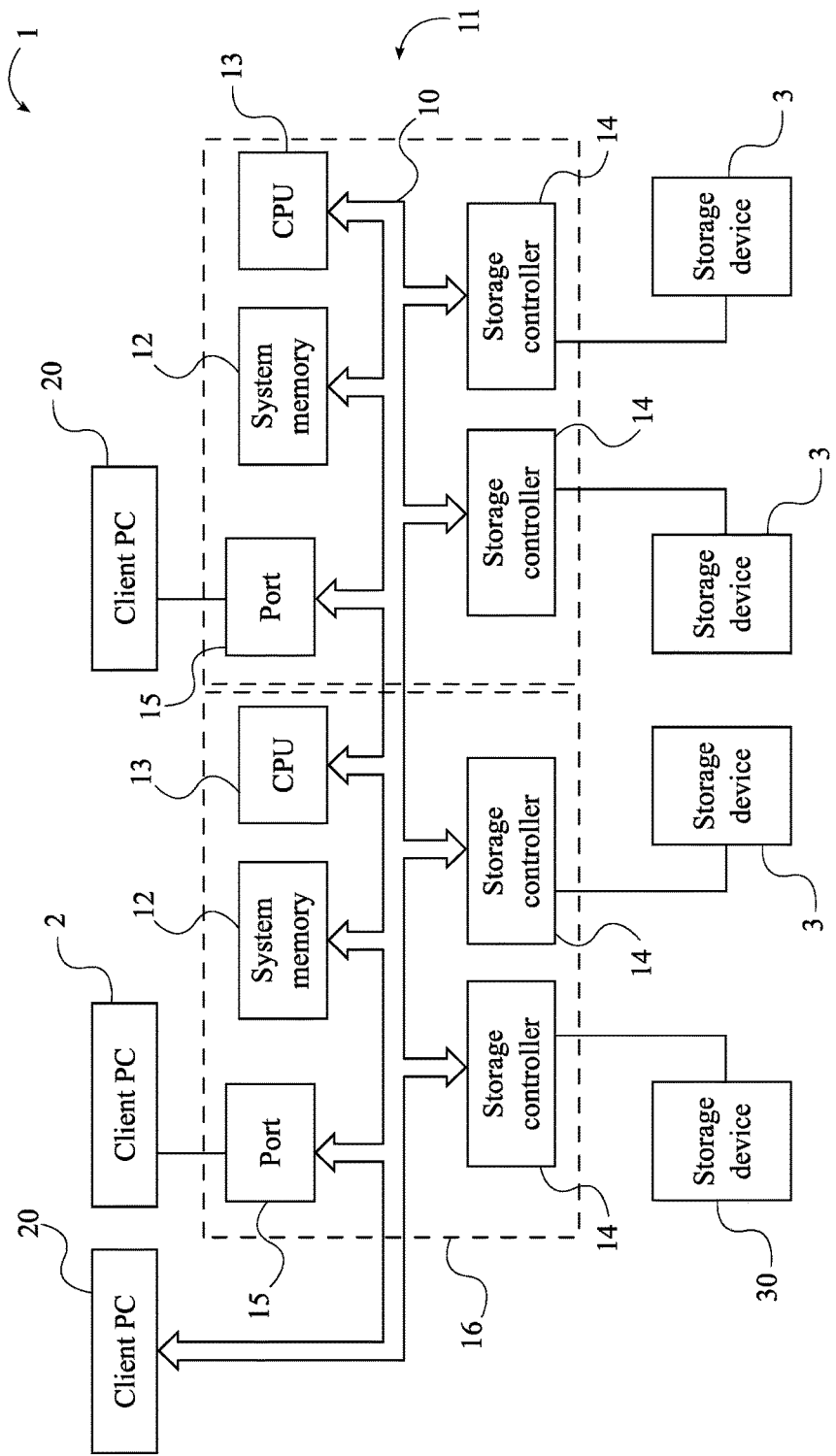
FIG. 1 is a diagram depicting the plurality of computing devices being interconnected with the plurality of storage devices via the unified data bus.

In further reference to FIG. 1, the storage cluster 1 comprises a unified data bus 10 and a plurality of storage systems 11; the computing device 2 and the plurality of storage systems 11 being interconnected via the unified storage bus. The unified storage bus, or "OmniBUS", is a local, high bandwidth bus that is utilized to transfer data between the computing device 2 and the plurality of storage devices 3 via the plurality of storage systems 11. As such, the computing device 2 is connected to the unified data bus 10 through a front end of the storage cluster 1, while each of the plurality of storage devices 3 is connected to the unified data bus 10 through a back end of the storage cluster 1. Data can be transferred though the unified data bus 10 in both directions, allowing for input/output (I/O) operations.

At least one of the plurality of storage devices 3 is connected to one of the plurality of storage systems 11, meaning each of the plurality of storage systems 11 is associated with a specific group of storage devices from the plurality of storage devices 3. In some embodiments, the number of storage devices in the specific group of storage devices for each of the plurality of storage systems 11 is identical, while in other embodiments the number of storage devices will vary from one storage system to another. The plurality of storage devices 3 can include disk drives, solid state drives, flash drives, non-volatile memory drive, or any other device configured for long-term persistent storage.

The storage cluster 1 is configured to: receive write commands and read commands from the computing device 2; transfer data between the computing device 2 and the plurality of storage devices 3; and reduce a number of data transfers when performing a multi-target transfer. Most importantly, the number of data transfers in the prior art is at least two, while in the present invention the number of data transfers required is only one. The architecture of the present invention also allows for the variable utilization of input resources and output resources, wherein the utilization of the input resources and the output resources is dependent on a configuration policy defined by management software that governs the storage cluster 1.

The configuration policy may define a single policy or multiple policies. In some embodiments, the input resources and the output resources of only a single storage system from the plurality of storage systems 11 are utilized in communications. However, due to the architecture of the present invention, the storage cluster 1 can also be configured such that the input resources and the output resources of at least two of the plurality of storage systems 11 can be shared between the selected storage systems. Furthermore, at least one of the plurality of storage systems 11 can be configured to share the input resources and the output resources with the computing device 2.

In reference to FIG. 1, each of the plurality of storage systems 11 comprises a main memory 12, a processor 13, at least one storage controller 14, and a connecting port 15. The main memory 12, the processor 13, and the storage controller 14 of each of the plurality of storage systems 11 is interconnected with the computing device 2 via the connecting port 15 of a corresponding storage system 16 from the plurality of storage systems 11. The connecting port 15 of each of the plurality of storage systems 11 is interconnected with the unified data bus 10 to provide the architecture for the front end of the storage cluster 1, wherein the computing device 2 is connected to the unified data bus 10 via the connecting port 15 of the corresponding storage system 16. In the preferred embodiment of the present invention, the connecting port 15 provides a means of connection between the computing device 2 and the storage cluster 1 without a protocol change.

The main memory 12 for each of the plurality of storage systems 11 is a local storage, such as random access memory (RAM). The processor 13 can be any type of processing unit, such as a central processing unit, microprocessor, microcontroller, etc. Both the main memory 12 and the processor 13 of each of the plurality of storage systems 11 are interconnected with the computing device 2 and the storage controller 14 of each of the plurality of storage systems 11 via the unified data bus 10.

In reference to FIG. 1, a corresponding storage device 30 from the plurality of storage devices 3 is connected to the storage controller 14 of the corresponding storage system 16, wherein the processor 13 executes transfer commands between the computer and the corresponding storage device 30 via the storage controller 14 of the corresponding storage system 16. In this way, the storage controller 14 of each of the plurality of storage systems 11 provides the architecture for the back end of the storage cluster 1. The computing device 2 has access to the storage controller 14 of each of the plurality of storage systems 11 via the unified data bus 10, and thus access to each of the plurality of storage devices 3.

Figure 3:
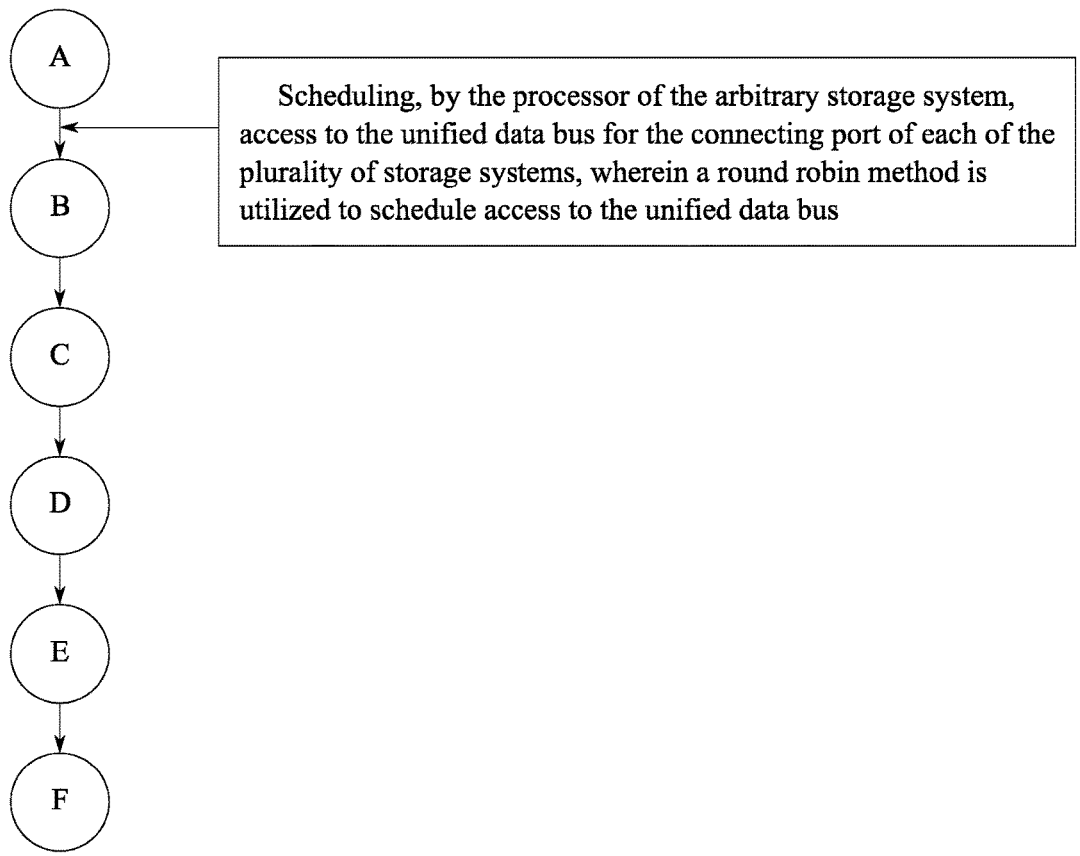
FIG. 3 is a flowchart thereof, further depicting the step for scheduling access to the unified data bus.

The interconnected data storage system allows a plurality of computing devices 20 to be connected to the storage cluster 1, wherein access to the storage cluster 1 is governed by the management software. The management software grants access to the plurality of computing devices 20 via the connecting port 15 of each of the plurality of storage systems 11, wherein one of the plurality of computing devices 20 corresponds to one of the plurality of storage systems 11. In reference to FIG. 3, the processor 13 of an arbitrary storage system from the plurality of storage systems 11 utilizes the management software to schedule access to the unified data bus 10 for the connecting port 15 of each of the plurality of storage systems 11. In the preferred embodiment of the present invention, a round robin method is utilized to schedule access to the unified data bus 10, as depicted in FIG. 9.

Figure 2:
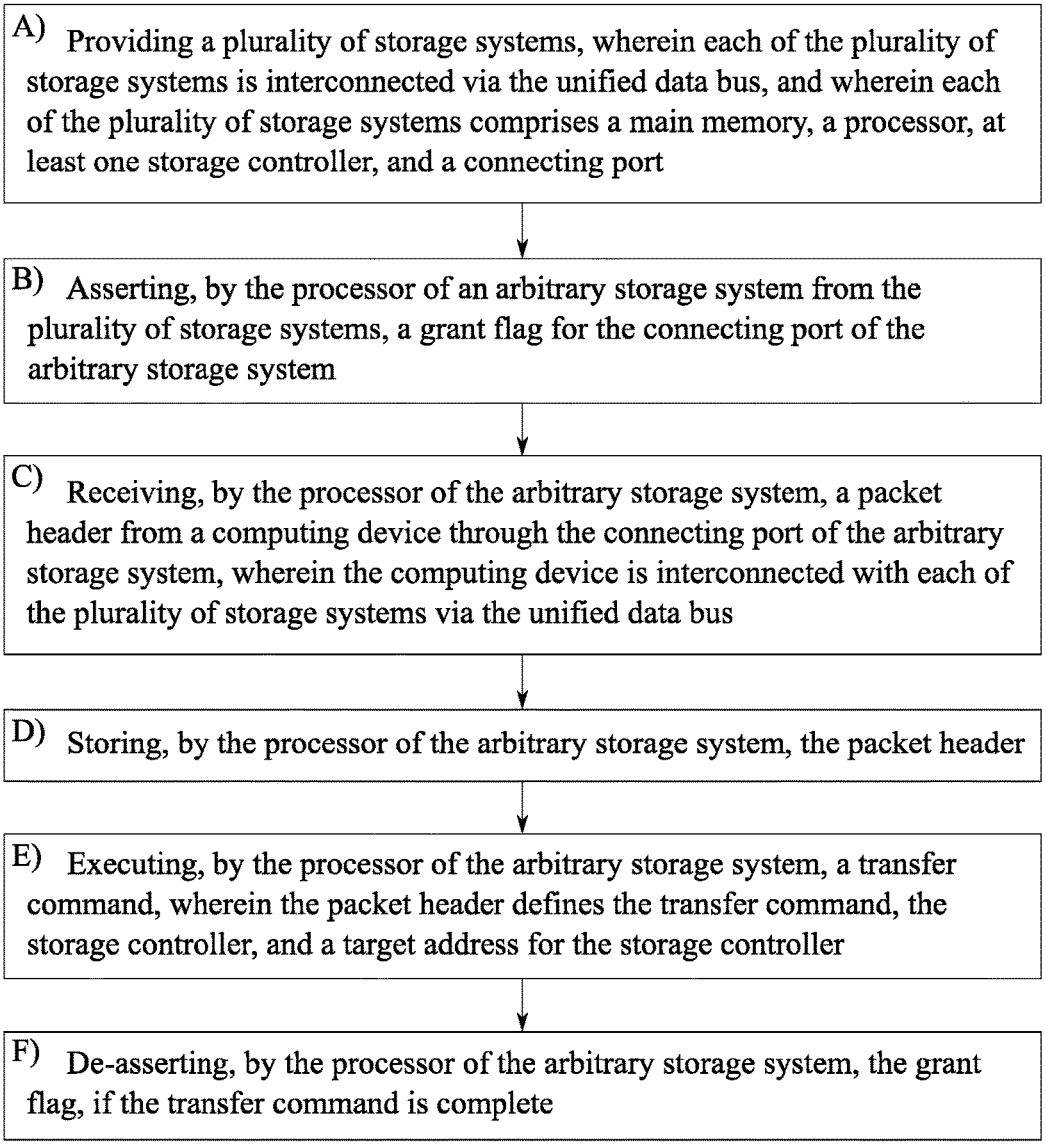
FIG. 2 is a flowchart depicting the steps for transferring data from a computing device to the plurality of storage devices via the storage cluster.
Figure 9:
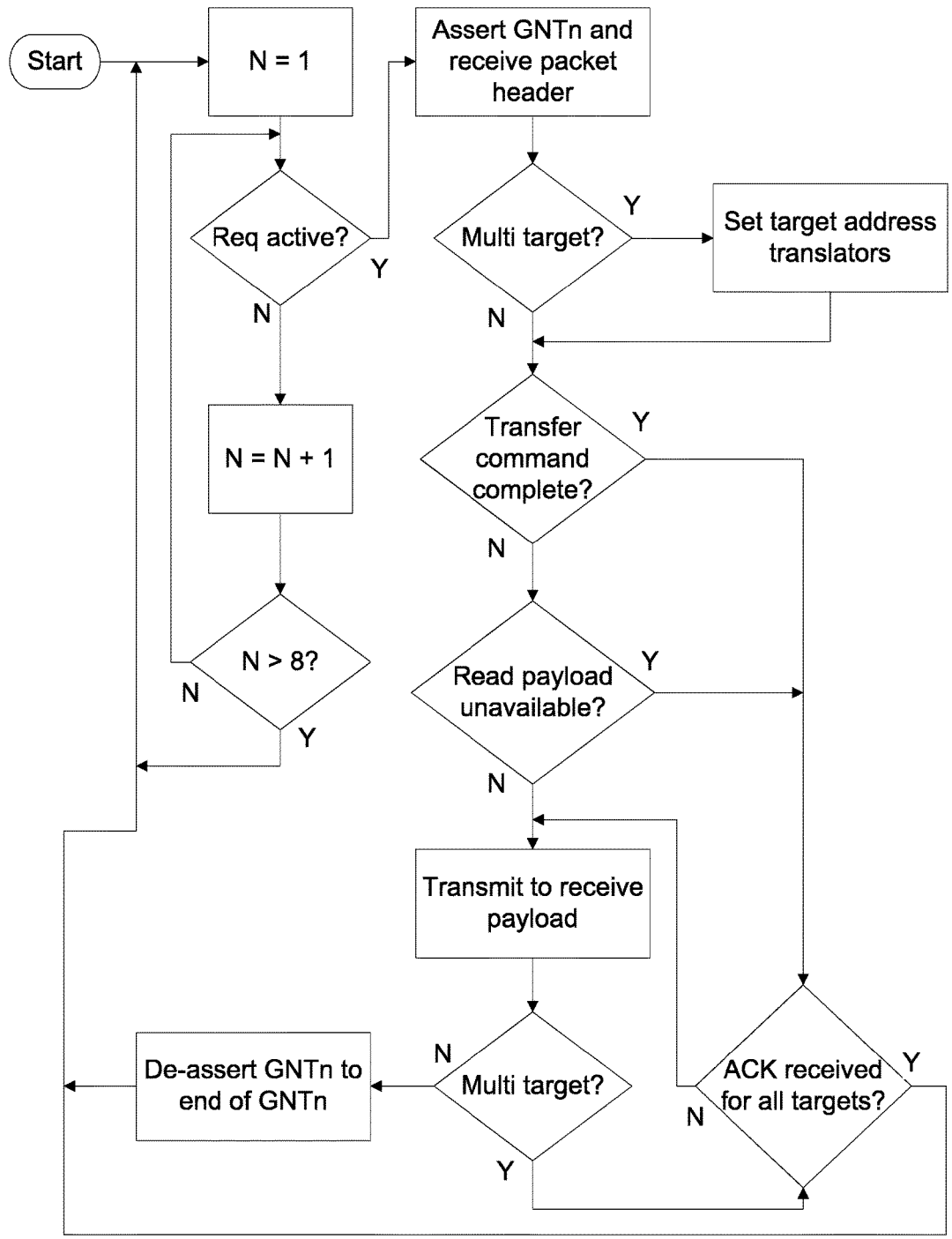
FIG. 9 is a flowchart depicting the steps for transferring data and providing access to the unified data bus, wherein a round robin method is used to provide access to eight connecting ports.

In reference to FIG. 2, the processor 13 of the arbitrary storage system asserts a grant flag, or GNTn as depicted in FIG. 9, for the connecting port 15 of the arbitrary storage system, wherein communications are opened between the computing device 2 and the plurality of storage devices 3. Once communications are opened, the processor 13 of the arbitrary storage system receives and stores a packet header from the computing device 2 through the connecting port 15 of the arbitrary storage system. The packet header includes a transfer command from the computing device 2, the storage controller 14, and a target address for the storage controller 14.

The storage controller 14 can be from one or more of the plurality of storage systems 11, such that data is transferred between one or more of the plurality of storage devices 3. For a single target transfer, the storage controller 14 is a single storage controller from one of the plurality of storage systems 11; the target address being for the single storage controller. For a single multi-target transfer, the storage controller 14 is more than one storage controller selected from one or more of the plurality of storage systems 11; the target address being a layer address.

Figure 4:
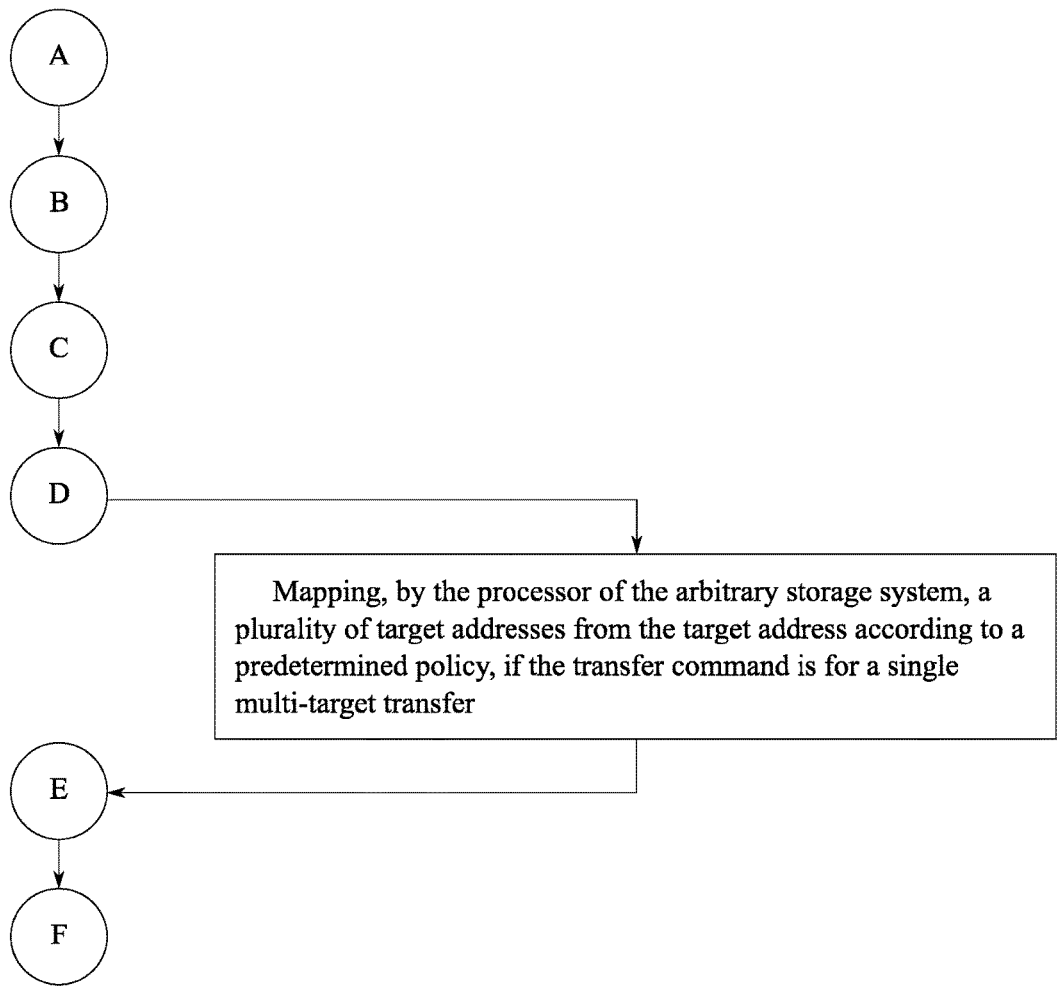
FIG. 4 is a flowchart thereof, further depicting the step for mapping a plurality of target addresses for a single multi-target transfer.

In reference to FIG. 4, if the transfer command is for the single multi-target transfer, then the processor 13 of the arbitrary storage system maps a plurality of target addresses from the target address according to a predetermined policy. The predetermined policy is defined by the management software, wherein the predetermined policy is used to set target address translators, as depicted in FIG. 9, used to unpack the plurality of target addresses from the target address. Once unpacked, the plurality of target addresses is used to route the data to selected storage devices from the plurality of storage devices 3 through the storage controller 14 of each of the plurality of storage systems 11; one of the plurality of target addresses corresponding to the storage controller 14 of one of the plurality of storage systems 11.

Once the target address or the plurality of target addresses has been set, the processor 13 of the arbitrary storage system executes the transfer command, as referenced in FIG. 2. The present invention allows for data transfers that can be accomplished with remote direct memory access (RDMA) or without RDMA. In many of the prior art, multiple data transfers are required for a multi-target transfer. With the present invention, only one multi-target RDMA transfer is required to transfer the data from the computing device 2 to the storage controller 14 of at least one of the plurality of storage systems 11.

The requirement of only a single multi-target transfer using the present invention, improves the overall performance of the interconnected data storage system by at least a factor of two. Using the unified data bus 10, the data can be sent from the computing device 2 and simultaneously copied onto one or more of the plurality of storage devices 3. The copy of data with zero overheard, as provisioned by the present invention, is very important in multiple environments such as cloud storage systems that copy data for redundancy purposes.

Figure 5:
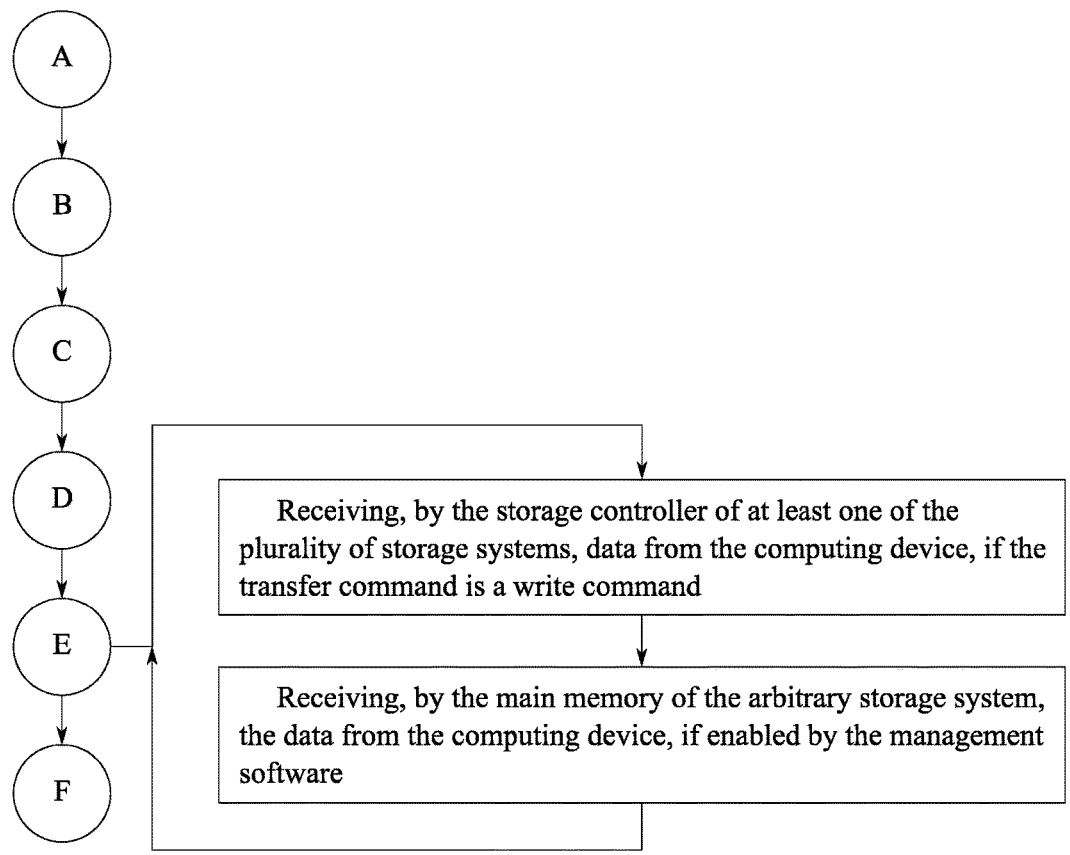
FIG. 5 is a flowchart thereof, further depicting steps for transferring data when the transfer command is a write command.

In reference to FIG. 5, if the transfer command is a write command, then the storage controller 14 of at least one of the plurality of storage systems 11 receives the data from the computing device 2, wherein the data is then stored on the corresponding storage device 30. Additionally, the main memory 12 of the arbitrary storage system or the main memory 12 of any other of the plurality of storage systems 11 can receive the data from the computing device 2 using the write command. The ability to write the data to the main memory 12 of one of the plurality of storage systems 11 is enabled or disabled through the management software.

Figure 6:
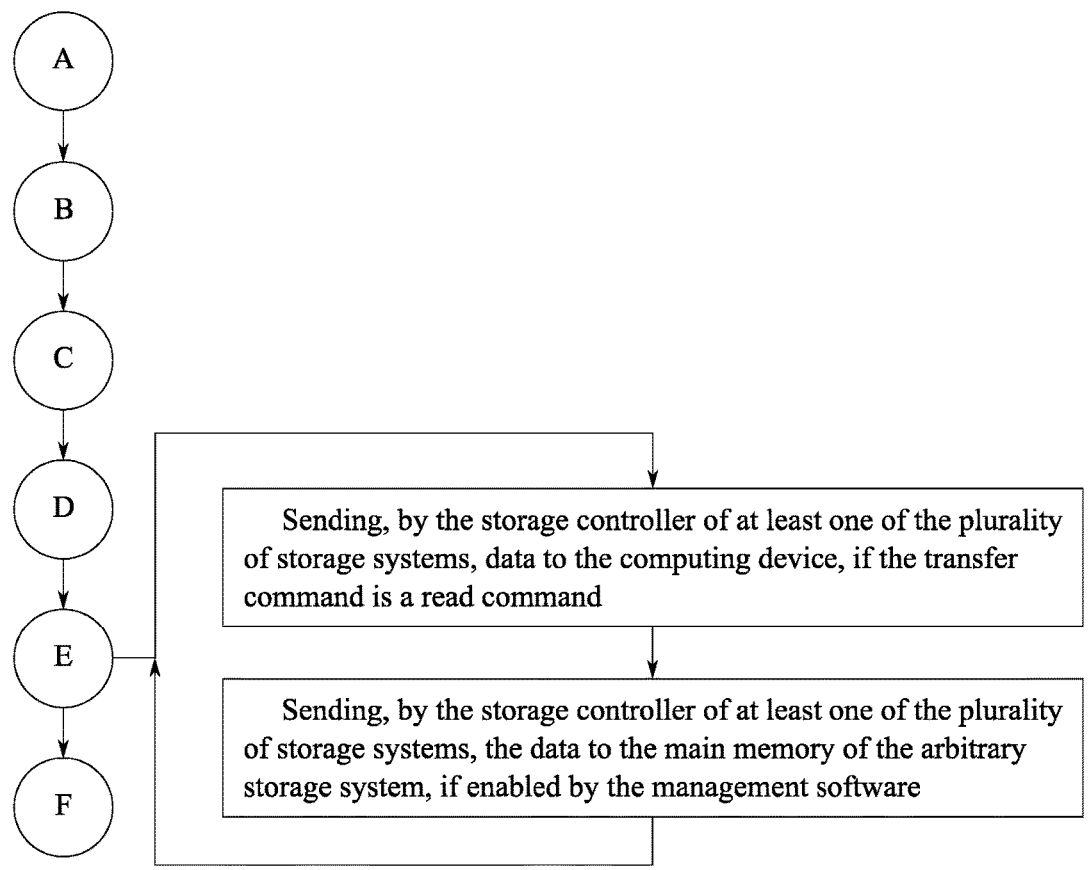
FIG. 6 is a flowchart thereof, further depicting steps for transferring data when the transfer command is a read command.

In reference to FIG. 6, if the transfer command is a read command, then the storage controller 14 of at least one of the plurality of storage systems 11 sends the data requested from the computing device 2. Additionally, at least one of the plurality of storage systems 11 can send the data requested to the main memory 12 of the arbitrary storage system or the main memory 12 of any other of the plurality of storage systems 11 using the read command. The ability of the main memory 12 of the plurality of storage systems 11 to read the data in addition to the computing device 2 is enabled or disabled through the management software.

Figure 7:
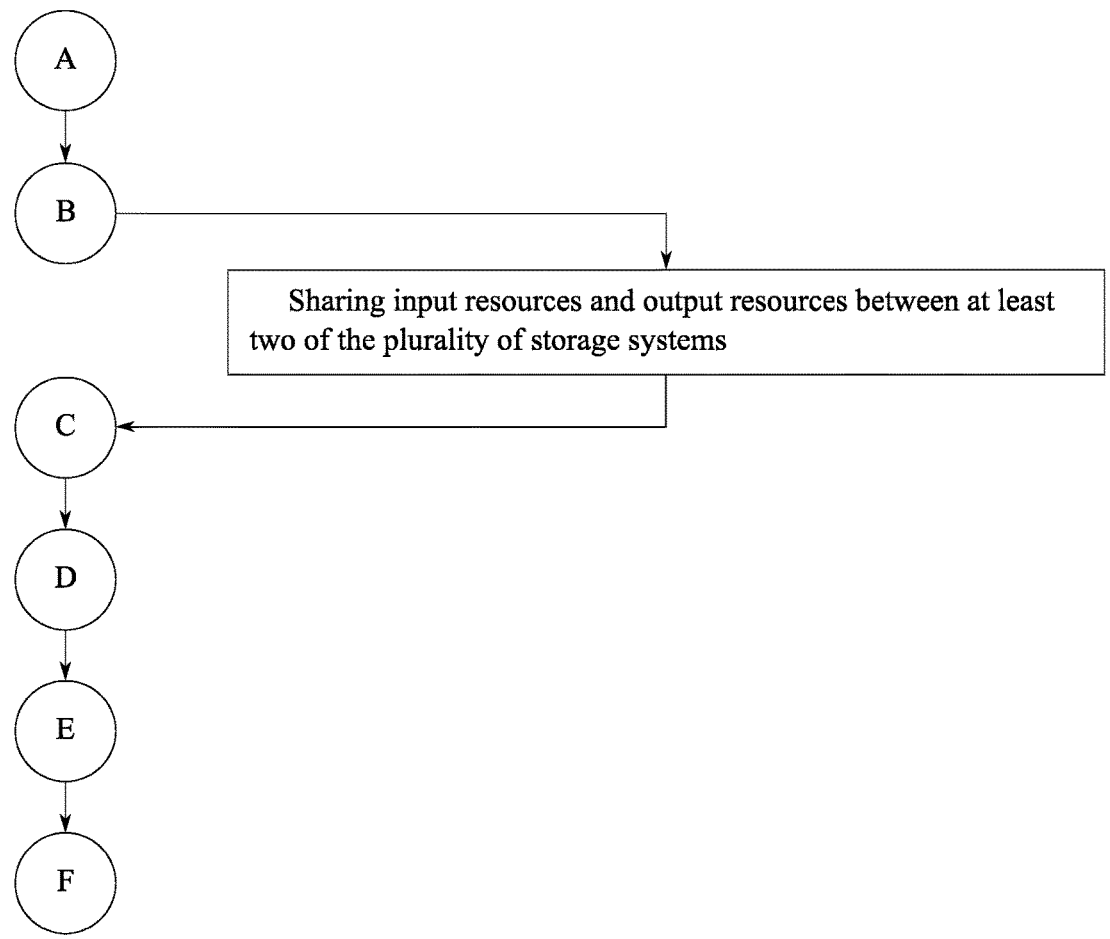
FIG. 7 is a flowchart thereof, further depicting the step for sharing resources between at least two of the plurality of storage systems.
Figure 8:
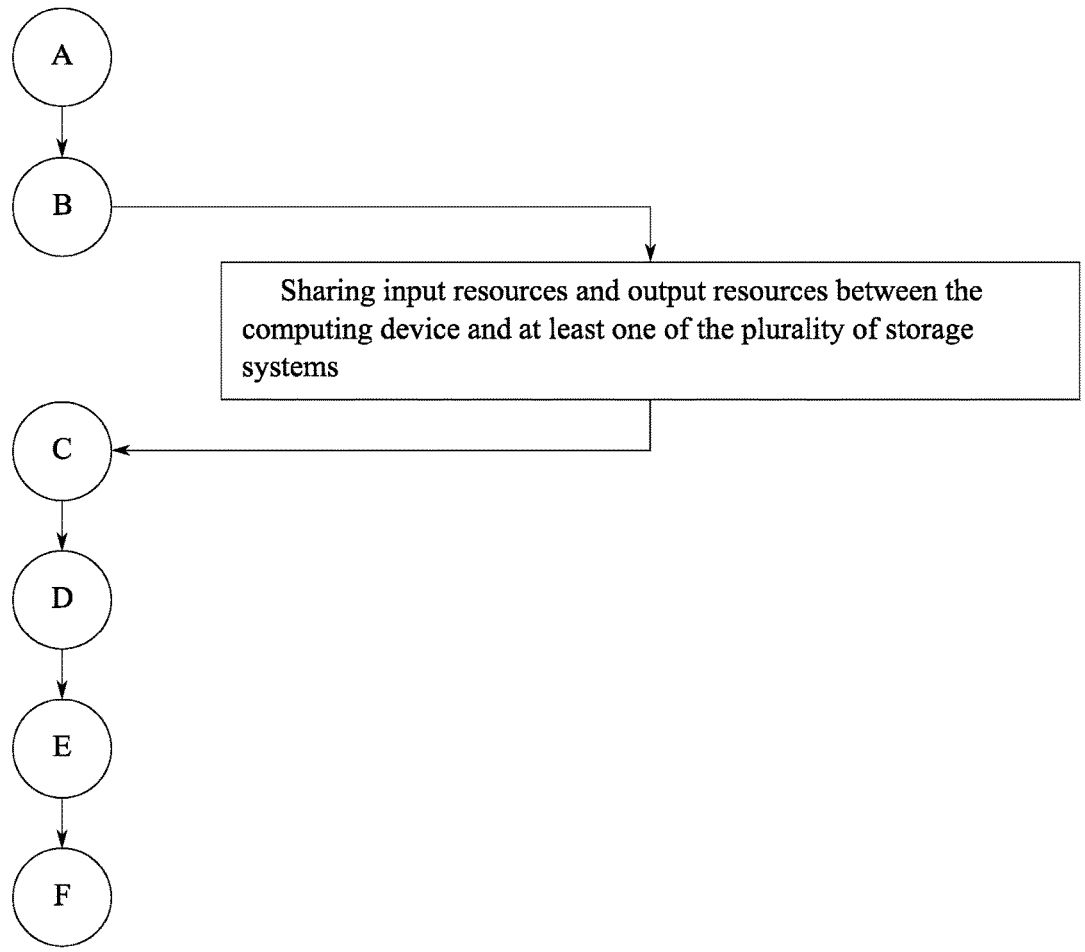
FIG. 8 is a flowchart thereof, further depicting the step for sharing resources between at least one of the plurality of storage systems and the computing device.

While the grant flag is asserted, the input resources and the output resources of the plurality of storage systems 11 can be shared be shared by the plurality of storage systems 11, if allowed by the configuration policy of the management software. In reference to FIG. 7, when enabled, the storage cluster 1 can share the input resources and the output resources between at least two of the plurality of storage systems 11, as defined by the configuration policy. Additionally, and with reference to FIG. 8, the input resources and the output resources of the storage cluster 1 can be shared with the computing device 2, if enabled by the configuration policy.

In reference to FIG. 2 and FIG. 9, when the transfer command is complete, the processor 13 of the arbitrary storage system de-asserts the grant flag for the connecting port 15 of the arbitrary storage system. The management processor 13 then follows the scheduling method to assert communications with a subsequent connecting port from one of the plurality of storage systems 11. Transfer commands are then carried out through the subsequent connecting port for a subsequent computing device from the plurality of computing devices 20. The cycle is then continued, allowing each of the plurality of computing devices 20 to access the plurality of storage devices 3 via the unified data bus 10.

Although the invention has been explained in relation to its preferred embodiment, it is to be understood that many other possible modifications and variations can be made without departing from the spirit and scope of the invention as hereinafter claimed.

What is claimed is:

1. An interconnected data storage system comprising:
a computing device;
a plurality of storage devices;
a storage cluster;
the storage cluster comprising a unified data bus and a plurality of storage systems;
the plurality of storage systems being interconnected with each other via the unified data bus;
at least one of the plurality of storage devices being connected to one of the plurality of storage systems;
the computing device being connected to the plurality of storage devices via the storage cluster;
each of the plurality of storage systems comprising a main memory, a processor, at least one storage controller and a connecting port, the main memory, the processor, the at least one storage controller and the connecting port being interconnected with each other via the unified data bus;
the computing device being connected to the connecting port of a corresponding storage system among the plurality of storage systems; and
a corresponding storage device from the plurality of storage devices being connected to the at least one storage controller of a corresponding storage system among the plurality of storage systems.

2. The interconnected data storage system as claimed in claim 1, wherein the storage cluster is configured to share input resources and output resources between at least two of the plurality of storage systems.

3. The interconnected data storage system as claimed in claim 1, wherein at least one of the plurality of storage systems is configured to share input resources and output resources with the computing device.

* * * * *